Figure 1:
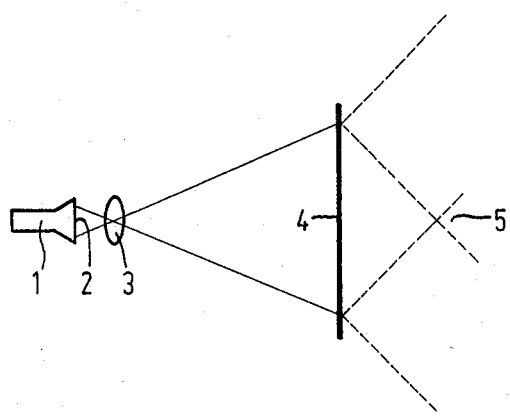

United States Patent [19]

van de Ven

[11] Patent Number: 4,666,248
[45] Date of Patent: May 19, 1987

[54] REAR-PROJECTION SCREEN

[75] Inventor: Johannes van de Ven, Eindhoven, Netherlands

[73] Assignee: U. S. Philips Corporation, New York, N.Y.

[21] Appl. No.: 862,062

[22] Filed: May 12, 1986

[30] Foreign Application Priority Data

Dec. 20, 1985 [NL] Netherlands ............... 8503526

[51] Int. Cl.$^4$ ............................................. G03B 21/60
[52] U.S. Cl. .................................................. 350/128
[58] Field of Search ............... 350/117, 127–129; 358/63, 87, 208, 231

[56] References Cited

U.S. PATENT DOCUMENTS 2,738,706  3/1956  Thompson, Jr. ............... 350/127 X
3,191,495  6/1965  Miller .............................. 350/128
3,523,717  8/1970  Glenn, Jr. ..................... 350/128 X
3,832,032  8/1974  Shimada ........................... 350/128
4,003,080  1/1977  Maiman et al. ............... 358/208 X
4,172,219 10/1979  Deml et al. ................... 350/128 X
4,298,246 11/1981  Iwamura ....................... 350/128 X Primary Examiner—Richard A. Wintercorn
Attorney, Agent, or Firm—Thomas A. Briody; William J. Streeter; Marianne R. Rlh

[57] ABSTRACT

The invention relates to a rear-projection screen whose optical and mechanical properties can be optimized substantially independently of one another. The back of the screen is provided with a two-dimensional structure of anamorphotic lenses in which a Fresnel lens may be integrated. The screen comprises a light-absorbing layer with transparent apertures in order to reduce the ambient light reflected by the screen.

9 Claims, 4 Drawing Figures

REAR-PROJECTION SCREEN

The invention relates to a rear-projection screen intended for reproducing on the front of the screen an image formed by a primary image source arranged behind the screen, which projection screen comprises a structure of anamorphotic lens elements and a light-absorbing layer formed with transparent apertures at the location of the foci of the lens elements. The invention also relates to a method for manufacturing such a screen.

Anamorphotic lens elements are lens elements which have different radii of curvature in two mutually perpendicular directions. The projection screen comprises a two-dimensional matrix of such lens elements.

A viewer who observes the screen should be given the impression of an image whose brightness distribution is as uniform as possible when the brightness variations forming the image are ignored. This viewer is situated in the space in front of the screen, referred to as the viewing space. The brightness decreases from the centre of this space towards the outside. Viewed from the projection screen the viewing space is characterized by the horizontal and the vertical viewing angle. These viewing angles define a space at whose edges the brightness has decreased to half the brightness in its centre. The magnitude of the horizontal and the vertical viewing angle depends on the optical properties of the screen.

A rear-projection screen is employed inter alia in cases where a picture or scene is to be projected in an illuminated environment by means of a conventional slide or film projector or a magnitified image of a picture or a scene on a cathode-ray tube is to be formed as an alternative to a super-large cathode-ray tube.

In order to obtain images of acceptable quality in illuminated environments, the ambient light reflected by the screen should be minimal. This applies both to specular and to diffuse reflection. Further, the screen brightness should be maximal despite the limited intensity of the primary picture source, for example a cathode-ray tube.

U.S. Pat. No. 4,003,080 describes a rear-projection screen comprising a single sheet which at its back carries a multitude of lens elements arranged in a two-dimensional matrix to focus the incident light in a series of transparent points in an otherwise light-absorbing surface at the front of the screen.

The known screen owes its mechanical stability to the transparent sheet carrying the lens elements. Sheets manufactured by means of current technologies are made of a plastics. Under the influence of variations in temperature and relative humidity such a sheet will be subject to dimensional changes, so that the primary image-source is no longer imaged sharply on the screen and the image observed by the viewer also becomes unsharp. The stability of the screen may be increased by the use of a thicker sheet. However, this has consequences for the focal length and the dimensions of the lens elements and hence for the quality of the optical system.

It is the object of the invention to provide a rear-projection screen whose mechanical and optical properties are substantially independent of one another, which ensures that a maximum amount of light from the primary image-source reaches the viewing space and which minimises reflections of ambient light to the viewing space.

To this end a rear-projection screen in accordance with the invention is characterized in that a light-transmitting foil is arranged on a flat supporting sheet, the back of the foil being provided with a structure of anamorphotic lenses and the front, which faces the supporting sheet, being formed with the light-absorbing layer with transparent apertures.

This construction enables the mechanical and optical properties of the screen to be optimised substantially independently of each other, whilst moreover the lens structure and the absorbing layer are adequately protected against external mechanical and chemical influences.

It is to be noted that the use of a supporting sheet in a rear-projection screen is known per se from British Patent Specification No. 1,548,944. However, said Patent Specification relates to a projection screen which instead of the lens structure employs a layer of a light-diffusing material such as wax or a polymer film in order to diffuse the light from the primary-image source. These materials are not suitable for the manufacture of a self-supporting sheet. Moreover, a rear-projection screen whose optical effect is based on the diffusion of light in random directions has less satisfactory properties with respect to the reflection of ambient light and the distribution of the signal light in the viewing space than a rear-projection screen in accordance with the invention. In practice, it is desirable that the viewing angle is large in the horizontal direction and is limited in the vertical direction. Signal light is the light originating from the primary image-source.

A rear-projection screen in accordance with the invention may be characterized further in that a Fresnel lens whose stepped side faces the anamorphotic lens structure and whose plane side faces the primary image-source is arranged between the lens structure and the image-source. This Fresnel lens constitutes a directional correction element which transmits the divergent signal beam to the lens structure as a substantially parallel beam. For the given orientation of the Fresnel lens practically all the signal light is direction towards the viewer. It is to be noted that U.S. Pat. No. 3,832,032 describes a transparent projection screen comprising a Fresnel lens which faces the primary image-source with its plane side. However, said Patent Specification relates to a rear-projection screen whose vertical image field is determined mainly by diffusion from microgrooves at the front surface of the front sheet and whose horizontal image field is mainly determined by vertically disposed cylindrical lenses at the back. As ambient light which is incident on the cylindrical lenses is totally internally such a screen still reflects about 10% of the ambient light.

Another rear-projection screen in accordance with the invention is characterized in that the Fresnel lens is constituted by the anamorphotic lens structure whose successive lenses have optical axes which relative to the normal to the foil extend at angles which increase from the centre towards the edges.

Thus, each of the anamorphotic lenses constitutes one facet of a Fresnel lens, so that the Fresnel lens does not require a separate surface or separate support. In the present embodiment the rear-projection screen comprises only one sheet, so that there are only two surfaces from which light can be reflected. Moreover, only one surface has to be provided with a lens structure, which is cost-saving in the mass-production of such a screen.

It is to be noted that it is known per se, from German Utility Model No. G 80.26.773, to arrange light-reflecting elements on a rear-projection screen in such a way that their optical axes are inclines relative to the normal to the screen. However, in said Utility Model the light-reflecting elements are arranged both on the front and the back of the projection screen and these elements comprise horizontal and vertical ridges instead of anamorphotic lenses. Obviously, this configuration cannot be combined with a light-absorbing layer which is formed with transparent apertures and which is integral with the sheet.

Preferably, a rear-projection screen in accordance with the invention is characterized in that the dimensions of the anamorphotic lens elements both in the horizontal and in the vertical direction lie between approximately 0.3 and 0.5 mm. Such a small pitch means a high resolution of the projected image.

Preferably, a rear-projection screen in accordance with the invention is characterized in that the transparent apertures in the light absorbing layer cover less than 25% of the surface area. As the total absorbing area directly influences the degree in which ambient light is reflected by the screen, it is essential to make the transparent apertures as small as possible. In a rear-projection screen in accordance with the invention approximately 75% to 80% of the surface area can be made light-absorbing without a reduction in image brightness. This is substantially higher than for the known screens.

A further characteristic feature of a rear-projection screen in accordance with the invention is that at least one of the surfaces of the screen is anti-reflecting. This step leads to an increased transmission of the projection screen to signal light and a reduced reflection of ambient light by the projection screen. This results in an improved brightness and contrast of the projected image.

A further characteristic feature of the rear-projection screen in accordance with the invention may be that the anti-reflecting surface is provided with a micro-relief-structure, whose details have dimensions of the order of 200 to 600 nm. This structure, referred to as an "moth's eye" structure, produces a graded transition from the refractive index of the surrounding medium to that of the projection screen so that the chromatic and directional sensitivity of this anti-reflection coating is substantially smaller than that of a conventional anti-reflecting coating comprising one or more thin layers.

A method of manufacturing a rear-projection screen in accordance with the invention is characterized in that the following steps are carried out in the given sequence: replicating on a first side of a thin transparent foil an anamorphotic lens structure formed in a mould, applying a light-sensitive material to the second side of the transparent foil, exposing the light-sensitive material through the lens structure, developing the light-sensitive material in such a way that non-exposed parts become opaque, and attaching the second side of the foil to a transparent supporting sheet.

A method of manufacturing a rear-projection screen of which at least one of the surface carries a micro-relief structure may be characterized further in that the micro-relief structure is formed simultaneously with the lens structure, starting from a mould which is also formed with a structure which is the inverse of the micro-relief structure. This method has the advantage that the subsequent application of the anti-reflection coating is no longer necessary.

Figure 2:
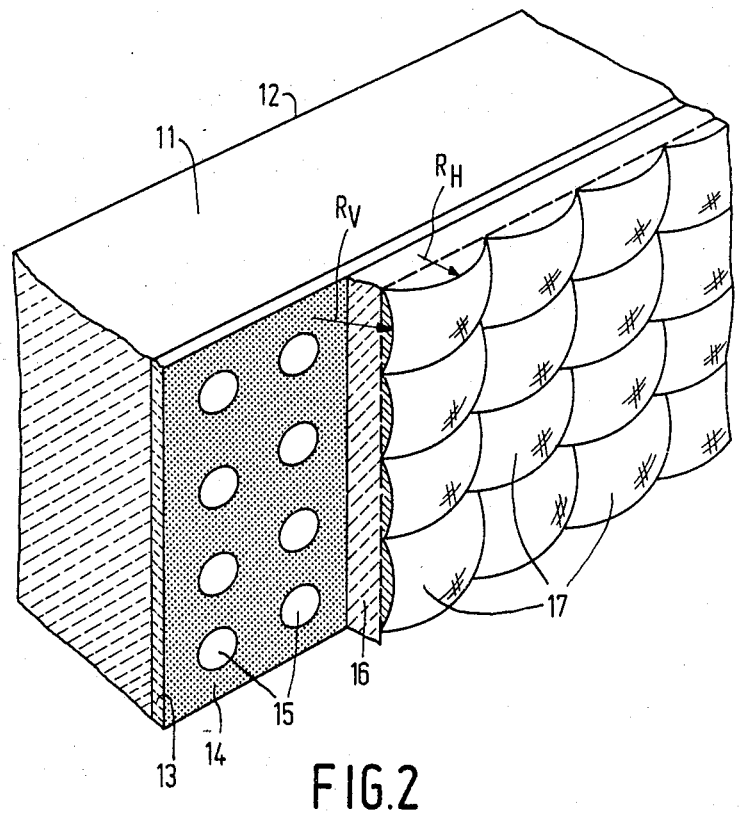
Figure 3A:
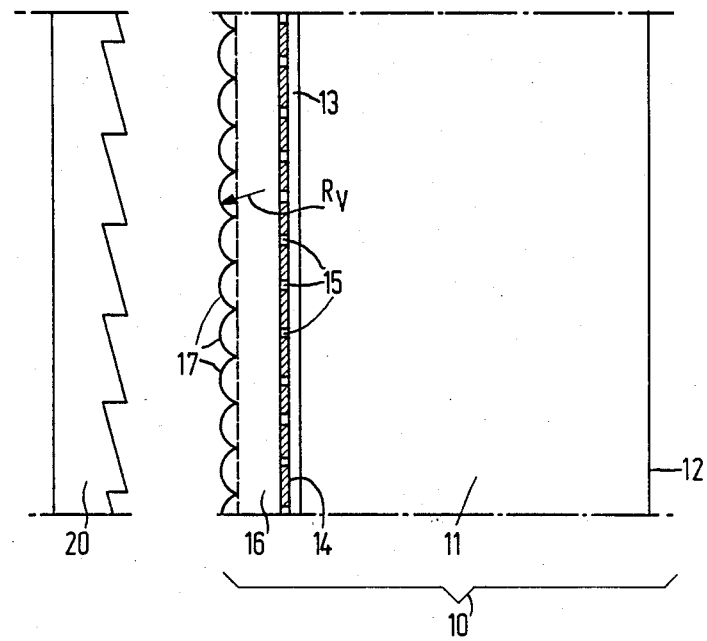
Figure 3B:
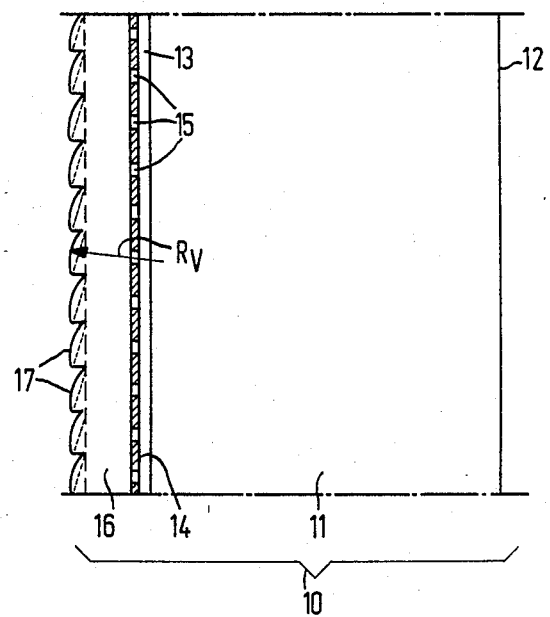

Embodiments of the invention will now be described in more detail, by way of example, with reference to the accompanying drawings, in which FIG. 1 illustrates the use of a rear-projection screen, FIG. 2 shows the laminated structure of a rear-peojection screen in accordance with the invention, and FIGS. 3a and 3b show two projection screens embodying the invention.

FIG. 1 shows a primary image-source 1, for example a cathode-ray tube on those faceplate 2 a picture or scene is imaged. This picture is imaged onto the rear-projection screen 4 by a projection-lens system 3. From the viewing space 4, represented in broken lines, the entire image can be observed satisfactorily. Obviously, the combination of the cathode-ray tube and projection-lens system may be replaced by a slide or film projector. It is to be noted that FIG. 1 merely illustrates the principle of a projection system. Instead of one cathode-ray tube and one projection-lens system it is possible to use, for example, three such tubes and systems when a colour picture is to be projected.

FIG. 2 is a partly cut-away view of a rear-projection screen in accordance with the invention, clearly illustrating the laminated structure of the screen. This Figure shows a supporting sheet 11, whose thickness is non-critical. In practical models this thickness has a value of between 3 and 5 mm. The back of the supporting sheet carries the structure which provides the desired light dispersal. This structure comprises a thin foil 16 which at its back is formed with a two-dimensional matrix of anamorphotic lens elements 17. The thickness of the foil is dictated by the desired focal length of the lens elements and by the mechanical stressed to which it is subjected during the production process. In practice, this foil has a thickness of between 0.2 and 0.5 mm.

Preferably, the dimensions in the horizontal and the vertical direction of the lens elements are of the order of 0.3 to 0.5 mm. The radii of curvature in the horizontal direction ($R_H$) and in the vertical direction ($R_V$) are different, so that the viewing angle in the two directions is also different. The lens elements may be spherical or aspherical lenses.

At its front the foil 16 is provided with a light-absorbing layer 14 in which transparent apertures 15 are formed in which the light incident on the lens elements 17 is focussed. Thus, care is taken that substantially all the signal lights traverses the small apertures, whilst most of the ambient light entering the screen is absorbed and can no longer reach the viewing space. In a rear-projection screen embodying the invention approximately 75% of the surface area of the layer 14 is absorbing.

The foil is attached to the supporting sheet 11 by means of, for example, a thin photopolymerisable coating 13, for example, of an ultraviolet-curable material.

FIGS. 3a and 3b show two embodiments of the invention. In these Figures identical reference numerals denote the same elements as in FIG. 2. In FIG. 3a a Fresnel lens 20 is arranged behind the projection screen 10 as a directional-correction element. The light from the primary image source, which is incident from the left, is refracted by the Fresnel lens 20 so as to be substantially perpendicularly incident on the screen 10.

FIG. 3b shows a preferred embodiment of the invention. In this embodiment each lens element is integral with a facet of a Fresnel lens. These facts are indicated in broken lines.

The orientations of the facets are dictated by the directions of the optical axes of the relevant anamorphotic lenses. It is to be noted that the Fresnel lens may be a two-dimensional lens, i.e. may exhibit a Fresnel structure in two mutually perpendicularly directions, the horizontal and vertical directions. Under specific circumstances, depending on the field of use, it may be sufficient to use a Fresnel structure in one direction only, for example the vertical direction, which simplifies the manufacture of the screen. The combined anamorphotic and Fresnel-lens structure ensures that the light issuing from the image source is directed towards the viewing space and is dispersed in this space.

In order to increase the transmission of the signal light and to reduce the reflection of ambient light one side or both sides of the projection screen may be made anti-reflecting. For this purpose the relevant surface may be provided with a coating of one or more layers of materials having a suitable refractive index and a suitable thickness. However, preferably the surface is provided with a "moth's eye" structure, that is a structure of minute pits or hills, the depth of the pits and the height of the hills and the distances between the pits or hills being of the order of magnitude of half the wavelength of the light being used. This structure provides a graded transition from the refractive index of the surrounding medium, for example air, to that of the screen material.

Particularly in the case of a rear-projection screen the micro-relief structure has the following advantages in comparison with an anti-reflection coating comprising one or more thin layers.

(a) The dependence on the direction and the wavelength of the incident radiation is reduced considerably.

(b) The structure is very suitable for use on plastics surfaces. When applying an anti-reflection coating on the surface of an optical element this layer is preferably cured. For this purpose this layer, and consequently the optical component, are exposed to a high temperature. If this component is made of a plastics this may result in its optical properties being modified.

(c) The micro-relief structure can be formed simultaneously with the optical element, if this element is manufactured by means of a replica process using a mould.

For further details on the micro-relief structure reference is made to "Optica Acta", 1982, Vol. 29, No. 7, pages 993-1009.

The manufacture of a rear-projection screen in accordance with the invention can be carried out in the following steps.

First of all a "master", in which a structure corresponding to the desired lens structure is formed by means of a numerically controlled milling-machine. From the master a plurality of moulds can be made by means of known metal-deposition technologies.

A mould thus obtained is filled with a polimerisable material in an adequately soft condition, for example an ultraviolet-curable material, after which the thin transparent foil 16 is pressed onto it. After curing of the polymerisable material the foil with the solidified lens structure is removed from the mould. Subsequently, the other side of the foil is provided with a light-sensitive material or photoresist. The photoresist is exposed through the lens structure. Further operations depend on the type of photoresist being used. In the case of a negative photoresist this resist cures at the location of the foci of the lens elements. The non-exposed noncured resist is removed and replaced by a light-absorbing material. Finally, the foil is optically coupled to the supporting sheet, for example also by means of a photopolymerisable material.

A projection screen thus manufactured transmits move than 80% of the signal light and reflects less than 5% of the ambient light. For this screen the horizontal viewing angle is approximately 90% and the vertical viewing angle is approximately 25%.

What is claimed is:

1. A rear-projection screen intended for reproducing on the front of the screen an image formed by a primary-image source arranged behind the screen, which projection screen comprises a structure of anamorphotic lens elements and a light-absorbing layer formed with transparent apertures at the location of the foci of the lens elements, characterized in that a light-transmitting foil is arranged on a flat supporting sheet, the back of the foil being provided with a structure of anamorphotic lenses and the front, which faces the supporting sheet, being formed with the light absorbing layer, with transparent apertures.

2. A rear-projection screen as claimed in claim 1, characterized in that a Fresnel lens whose stepped side faces the anamorphotic lens structure and whose plane side faces the primary image-source is arranged between the lens structure and the image-source.

3. A rear-projection screen as claimed in claim 1, characterized in that the Fresnel lens is constituted by the anamorphotic lens structure whose successive lenses have optical axes which relative to the normal to the foil extend at angles which increase from the centre towards the edges.

4. A rear-projection screen as claimed in claim 1, 2 or 3, characterized in that the dimensions of the anamorphotic lens elements both in the horizontal and in the vertical direction lie between approximately 0.3 and 0.5 mm.

5. A rear-projection screen as claimed in claim 1, 2, 3 or 4, characterized in that the transparent apertures in the light-absorbing layer cover less than 25% of the surface area.

6. A rear-projection screen as claimed in claim 1, 2, 3, 4 or 5, characterized in that at least one of the surfaces of the screen is anti-reflecting.

7. A rear-projection screen as claimed in claim 6, characterized in that the anti-reflecting surface is provided with a micro-relief structure whose details have dimensions of the order of 200 to 600 nm.

8. A method of manufacturing a rear-projection screen as claimed in any one of the preceding claims, characterized in that the following steps are carried out in the given sequence:

replicating on a first side of a thin transparent foil an anamorphotic lens structure formed in a mould, applying a light-sensitive material to the second side of the transparent foil, exposing the light-sensitive material through the lens structure, developing the light-sensitive material in such a way that non-exposed parts become opaque, and attaching the second side of the foil to a transparent supporting sheet.

9. A method as claimed in claim 8, for manufacturing a transparent projection screen of which at least one of the surfaces carries a micro-relief structure characterized in that the micro-relief structure is formed simultaneously with the lens structure, starting from a mould which is also formed with a structure which is the inverse of the micro-relief structure.

* * * * *